US011663285B2

(12) United States Patent
Putti et al.

(10) Patent No.: US 11,663,285 B2
(45) Date of Patent: May 30, 2023

(54) WEBPAGE MANAGEMENT IN NATIVE APPLICATION

(71) Applicant: Microsoft Technology Licensing, LLC, Redmond, WA (US)

(72) Inventors: Eswar Sai Putti, Bangalore (IN); Arulanandan Ponnivalavan, Bangalore (IN); Shamit Ghosh, Alipuduar (IN); Kushal Ghosh, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/527,674

(22) Filed: Nov. 16, 2021

(65) Prior Publication Data
US 2023/0073592 A1 Mar. 9, 2023

(30) Foreign Application Priority Data
Sep. 6, 2021 (IN) .............................. 202141040286

(51) Int. Cl.
G06F 3/0482 (2013.01)
G06F 3/0484 (2022.01)
(Continued)

(52) U.S. Cl.
CPC .......... G06F 16/9574 (2019.01); G06F 9/451 (2018.02); G06F 16/9577 (2019.01)

(58) Field of Classification Search
USPC ........................................................ 709/203
See application file for complete search history.

(56) References Cited

U.S. PATENT DOCUMENTS 7,100,195 B1 * 8/2006 Underwood ........ H04L 63/0823
707/999.009
8,656,265 B1 2/2014 Wahbe et al.
(Continued)

FOREIGN PATENT DOCUMENTS

CN 110321503 A 10/2019
CN 113282363 A 8/2021
(Continued)

OTHER PUBLICATIONS

"Reduce App Load Time and Increase Speed—Your Ultimate Guide to a Better UX", Retrieved from: https://www.appmysite.com/blog/reduce-app-load-time-and-increase-speed-your-ultimate-guide-to-a-better-ux/, Sep. 14, 2020, 10 Pages.
(Continued)

Primary Examiner — Jude Jean Gilles
(74) Attorney, Agent, or Firm — Schwegman Lundberg & Woessner, P.A.

(57) ABSTRACT

Methods, systems, and computer programs are presented for presenting web components in a native application. One method includes operations for monitoring a first user interface (UI) presented on a native app, and based on the monitoring, determining a second UI that may be selected by a user when accessing the first UI. The second UI is based on web components downloaded from a web server. The method further includes operations for authenticating the user for accessing the web server, selecting web components associated with the UI for preloading, and preloading the selected web components. Further yet, the method includes operations for detecting that the user has selected the second UI, and causing presentation of the second UI, which includes presenting the preloaded components on the second UI and downloading and presenting in the second UI the components not preloaded.

20 Claims, 7 Drawing Sheets

(51) Int. Cl.
   *G06F 3/04842*   (2022.01)
   *G06F 9/46*      (2006.01)
   *G06F 16/957*    (2019.01)
   *G06F 9/451*     (2018.01)

(56) References Cited

U.S. PATENT DOCUMENTS

| | | | |
|---|---|---|---|
| 9,354,776 B1* | 5/2016 | Subramanian | G06F 3/0486 |
| 9,929,916 B1* | 3/2018 | Subramanian | G06F 3/0484 |
| 2008/0201332 A1* | 8/2008 | Souders | G06F 16/9535 |
| 2008/0209068 A1* | 8/2008 | Herzog | H04L 61/2553 |
| | | | 709/232 |
| 2012/0167122 A1* | 6/2012 | Koskimies | G06F 9/5027 |
| | | | 719/328 |
| 2016/0179312 A1* | 6/2016 | Lam | G06F 3/0483 |
| | | | 715/738 |
| 2016/0179494 A1* | 6/2016 | Pavlov | H04L 67/1004 |
| | | | 717/177 |
| 2016/0231881 A1* | 8/2016 | Sirpal | G06F 3/0482 |
| 2017/0142118 A1* | 5/2017 | Androsov | G06F 21/6218 |
| 2017/0346876 A1* | 11/2017 | Lim | G06F 3/04842 |
| 2018/0203839 A1 | 7/2018 | MyrÉn | |
| 2018/0332128 A1* | 11/2018 | Gunther | G06F 3/0483 |
| 2019/0130750 A1* | 5/2019 | Cole | G06F 16/958 |
| 2019/0391972 A1* | 12/2019 | Bates | G06F 16/51 |
| 2020/0145515 A1* | 5/2020 | Fleck | H04L 63/1441 |

FOREIGN PATENT DOCUMENTS

| | | | |
|---|---|---|---|
| JP | 6621543 | B2 | 11/2019 |
| WO | 2020199544 | A1 | 10/2020 |

OTHER PUBLICATIONS

"International Search Report and Written Opinion Issued in PCT Application No. PCT/US22/036605", dated Oct. 25, 2022, 12 Pages.

* cited by examiner

FIG. 1

WEBPAGE MANAGEMENT IN NATIVE APPLICATION

CROSS-REFERENCE TO RELATED APPLICATIONS

This application claims priority under 35 U.S.C. § 119 to Indian provisional patent application 202141040286, filed Sep. 6, 2021, the disclosure of which is incorporated herein by reference in its entirety.

TECHNICAL FIELD

The subject matter disclosed herein generally relates to methods, systems, and machine-readable storage media for presenting web content within a native application.

BACKGROUND

When providing web functionality for accessing data on a remote server, developers have the choice of using a browser-based application or writing a program, referred to as a native application or native app, that connects to the server for exchanging data and then presenting the information or getting user input on a user interface.

However, writing code for each option in the native app may be expensive, especially when there is already a browser interface for the same functionality. Sometimes a hybrid approach is used, where the native app embeds a simple browser engine inside the native app user interface (UI) for certain functionality. However, using the embedded browser engine may result in a decreased performance due to the overhead imposed by the browser, such as authenticating the user each time information is downloaded.

BRIEF DESCRIPTION OF THE DRAWINGS

Various of the appended drawings merely illustrate example embodiments of the present disclosure and cannot be considered as limiting its scope.

FIG. 1 is a user interface for a native application, according to some example embodiments.

DETAILED DESCRIPTION

Figure 2:
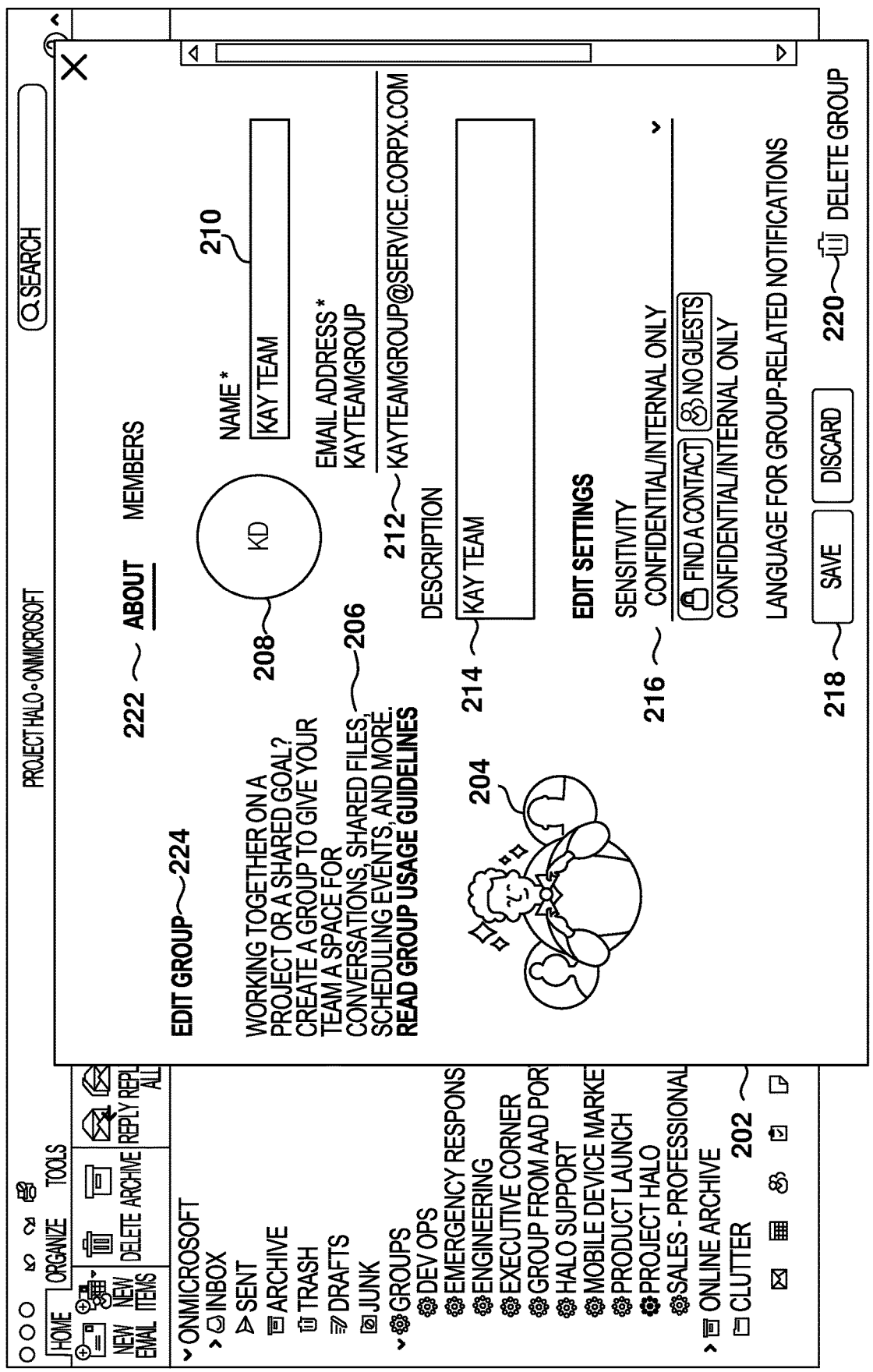
FIG. 2 is web user interface presented within the native application, according to some example embodiments.

Example methods, systems, and computer programs are directed to presenting web components in a native application. Examples merely typify possible variations. Unless explicitly stated otherwise, components and functions are optional and may be combined or subdivided, and operations may vary in sequence or be combined or subdivided.

In the following description, for purposes of explanation, numerous specific details are set forth to provide a thorough understanding of example embodiments. It will be evident to one skilled in the art, however, that the present subject matter may be practiced without these specific details.

A loader manager is a component of a native app that predicts functionality that may be used by a user, functionality that requires communication with a web server. The loader manager determines which components to preload before the user invokes a given feature, so when the user selects the feature, some web components are already in the memory of the machine, and the response is faster. Further, the loader manager authenticates the user with the server in advance so when the user requires data from the server, the user does not have to wait for authentication. Preloading the web component reduces the load time and response time to activate web-dependent functionality. Preloading does not include showing the preloaded information to the user. Further, a single code base can be used for the loader manager that can be shared by multiple native apps in the same platform.

One general aspect includes a method that includes an operation for monitoring a first user interface (UI) presented on a native app, and based on the monitoring, determining a second UI that may be selected by a user when accessing the first UI. The second UI is based on web components downloaded from a web server. The method further includes operations for authenticating the user for accessing the web server, selecting web components associated with the UI for preloading, and preloading the selected web components. Further yet, the method includes operations for detecting that the user has selected the second UI, and causing presentation of the second UI, which includes presenting the preloaded components on the second UI and downloading and presenting in the second UI the components not preloaded.

Figure 1:
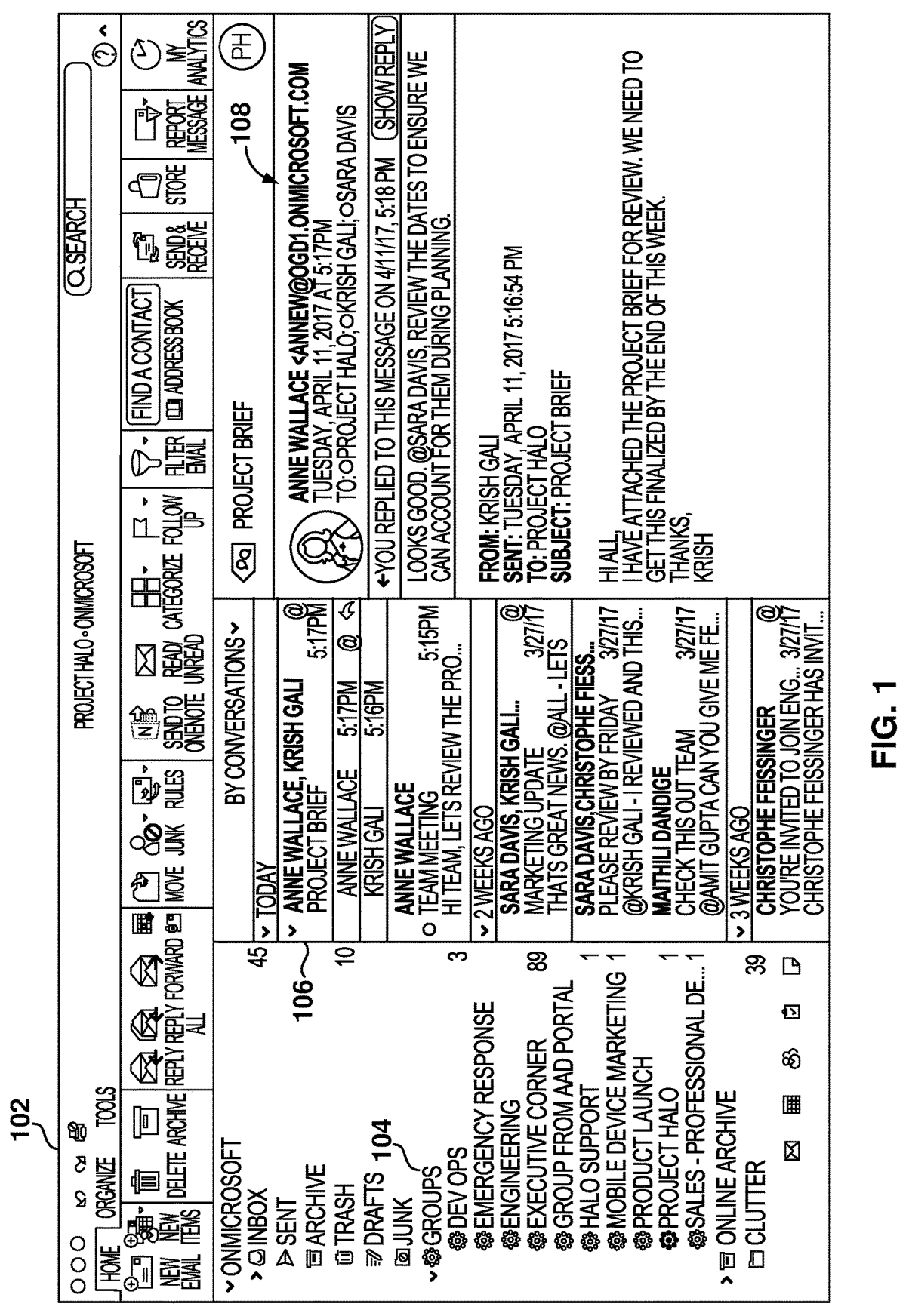

FIG. 1 is a user interface 102 for a native app, according to some example embodiments. The native app Microsoft Outlook® is an email app, which includes options for reading email in panel 106, and a view of the email in panel 108. On the left panel, an option 104 is provided for groups functionality, each group corresponding to a set of users of the native app.

The user interface (UI) 102 is provided as a native function and does not rely on browser functionality. The UI 102 provides options related to groups, such as sending an email to the group, reading messages from the group, adding members to the group, deleting members from the group, inviting users to the group, etc. Microsoft Outlook also provides a web version to users as an alternative to the native app.

FIG. 2 is web UI 202 presented within the native application, according to some example embodiments. After the user selects the edit-group option, the UI 202 is presented. In this example, the UI 202 is the same interface as in the corresponding browser application, and the native app 202 displays the UI 202 using a browser.

The UI 202 includes several components, including a title 224 of the UI (e.g., Edit group), menu options 222 (e.g., About (which is selected), and Members), a menu description 206, an image 204, a photo 208 for the group, a box 210 for editing the name of the group, an email address 212 of the group (e.g., kayteamgroup@service.corpx.com), a box 214 for editing the group description, a sensitivity drop-down menu 216, buttons 218 to save and discard settings, and button 220 for deleting the group.

Some of the components are generic and do not depend on user or app parameters and are referred to herein as static components. Other components depend on the user or the app parameters, such as the user name or the group name, and are referred to as dynamic components.

Some of the static components include the title 224, the menu options 222, the menu description 206, the image 204, the box 210 for editing the name of the group, the box 214 for editing the group description, the sensitivity drop-down menu 216, the buttons 218, and the button 220 for deleting the group.

Some of the dynamic components include the photo 208, the current name of the group in the box 210, the email address 212, the description of the group in the box 214, and the value for the sensitivity drop-down menu 216.

It is noted that the embodiments illustrated in FIG. 2 are examples and do not describe every possible embodiment. Other embodiments may utilize different combinations, have other static or dynamic components, have fewer components, etc. The embodiments illustrated in FIG. 2 should therefore not be interpreted to be exclusive or limiting, but rather illustrative.

If the native app simply uses a browser to display UI 202, the embedded browser has to perform the operations associated with the browser, such as authenticating the user, downloading all the components, etc. Further, the native app can interact with the web component loaded in the browser and leverage the native capabilities, such as performing file input and output operations, access systems settings, etc., inside the web browser.

In some example embodiments, a loader manager program preloads some of the components, so when the user selects the option to edit the group, the UI 202 immediately shows the preloaded components. Also, since the user has been already authenticated, authentication is not needed at this point, resulting in faster presentation of the UI 202.

In some example embodiments, the static components are preloaded, and the dynamic components are loaded when the user selects the UI. In other example embodiments, some, or all, of the dynamic components are also preloaded. For example, when the user is presented with the UI of FIG. 1, the program obtains the list of all the groups of the user, and then preloads the dynamic components for all or some of the groups.

It is noted that some embodiments are described with reference to the email application, but the same principles may be used for any other native apps incorporating browser functionality, such as web-based editors, cooperation apps, web-based spreadsheets, video conferencing, banking apps, search apps, games, payment apps, etc.

Figure 3:
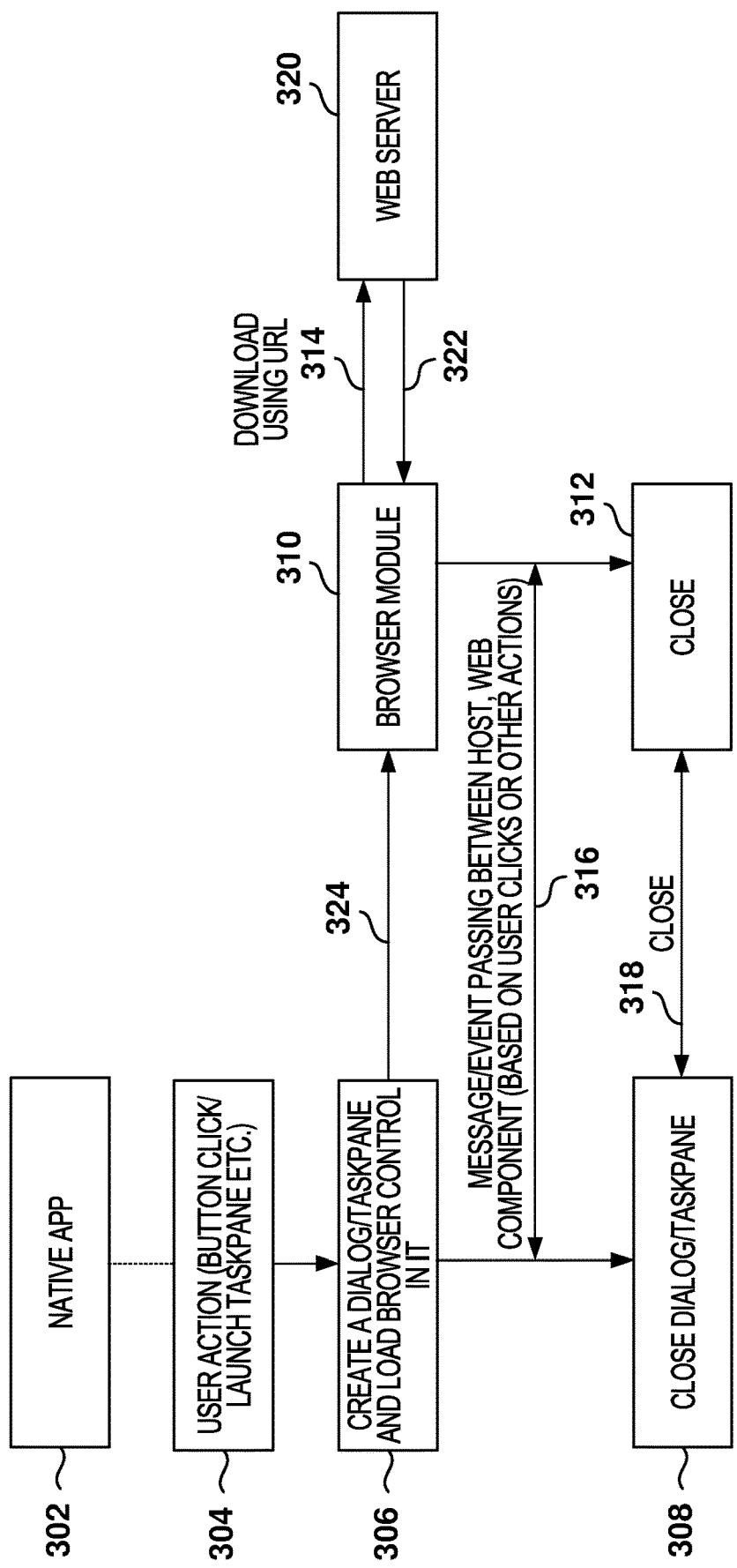
FIG. 3 illustrates a process for loading web components, according to some example embodiments.

FIG. 3 illustrates a process for loading web components, according to some example embodiments. In some applications, a hybrid model is used to combine native capabilities and web functionality. Web components are used with browser-type controls (e.g., Webview2, Progressive Web Apps (PWAs)) in native apps. This facilitates development of native apps and provides uniformity across platforms (e.g., web browser, mobile access, desktop access).

While using the native app 302, at operation 304, a user selects an UI action (e.g., button click, launch taskpane) that requires web services. From operation 304, the method flows to operation 306, where the native app 302 loads 324 a browser module 310, which is a browser program that interacts with the web server 320. The browser module 310 navigates 314 to the web server 320 using the corresponding Uniform Resource Locator (URL) and the web server 320 returns 322 the requested data (e.g., webpage).

Communications are exchanged between the browser module 310 and the web server 320 (e.g., messages, events) and the browser module passes 316 the information to the native app 302.

At operation 308, the native app 302 closes the corresponding dialog or task pane, and the native app 302 sends a close request 318 to the browser module 310. At operation 312, the browser module 310 closes.

One of the problems with this approach is that operations 314 and 322 can take a large amount of time (e.g., two to ten seconds or more) because of the network calls to the corresponding URLs, the downloading of scripts (e.g., Java Script bundles), and operations to authenticate the user for access to the requested information or service. The result is a poor user experience because of the delay caused by using the browser module 310.

Further, after the user closes the browser module 310, all the information previously obtained, including the user authentication, is lost, and future requests will need to restart from the beginning.

Figure 4:
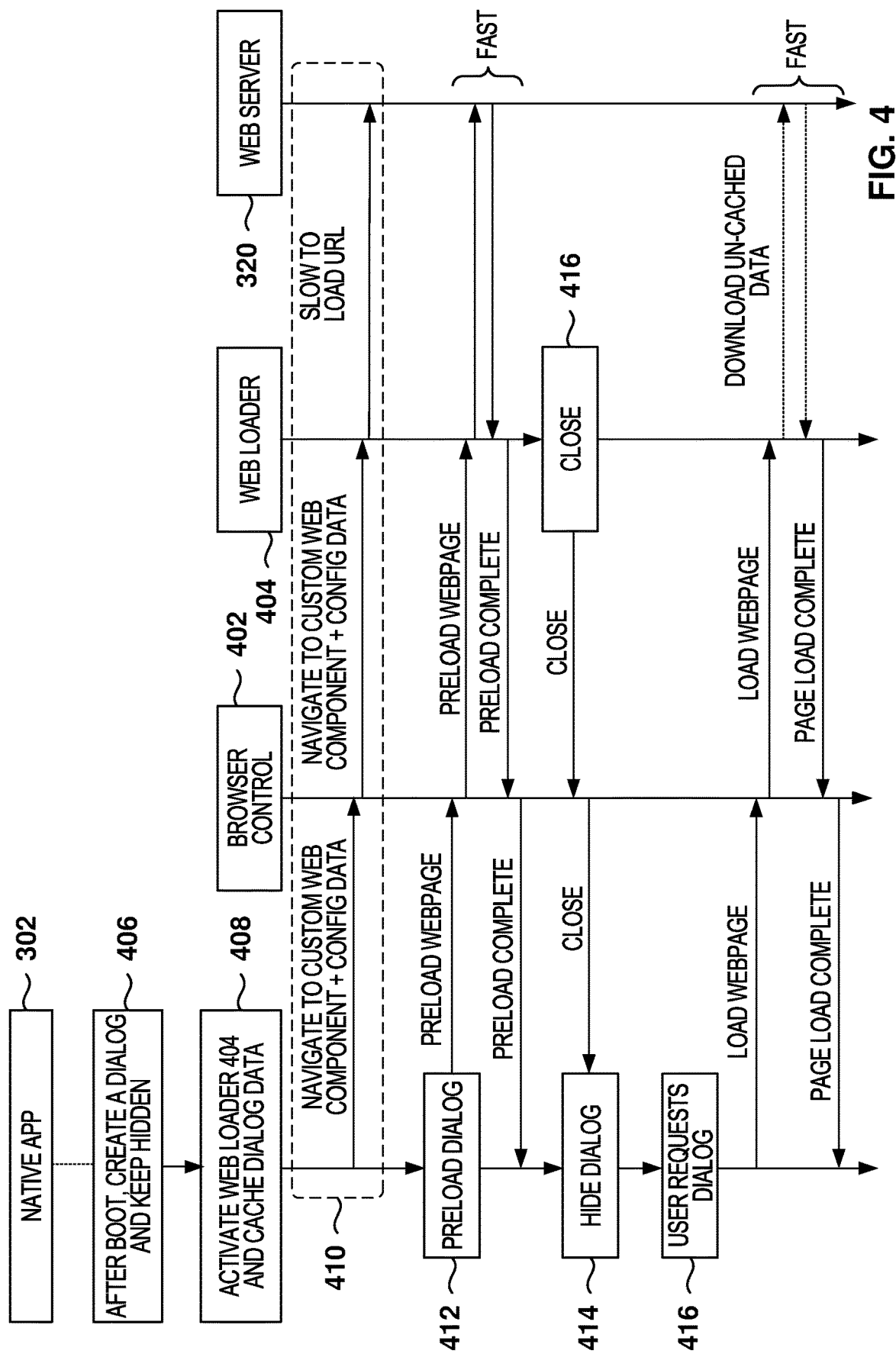
FIG. 4 illustrates a method for preloading web components, according to some example embodiments.

FIG. 4 illustrates a method for preloading web components, according to some example embodiments. To solve the slow-response problem, some embodiments utilize a strategy to preload web components, even before the user activates the corresponding feature in the native app. The preloaded components are cached and kept in memory, so when the user activates the web feature, the preloaded components are immediately available without having to download from the server. This results in a seemingly instantaneous response by the native app for all or part of the elements of the UI.

There are three aspects to the preload strategy. First, completing the authentication process in advance. The user is authenticated with the server, even before the authentication is needed, and when the web access is activated, then the user is already authenticated, so the authentication does not have to be performed. This means that the authentication is performed in advance, and the authentication token is stored and made available for future use. Further, the authentication token may be used multiple times as needed.

Second, there are static components and dynamic components. The static components can be downloaded ahead of time, so when they are needed, they are already cached in memory. Further, all or part of the dynamic content may also be preloaded. As discussed above in the example for groups, the dynamic content for the groups of the user may also be preloaded so when the user selects the option to edit a particular group, all the components are already available in the local memory, resulting in a seemingly instantaneous response by the native app.

Third, the loader manager utilizes heuristics to determine which web components to preload. For example, the heuristics may be based on user behavior, how often a feature is selected by users, the benefit of preloading components, the amount of bandwidth and computer resources available, etc. By using heuristics, a balance is achieved between the cost and the benefit of preloading, to provide a fast response without burdening the system by preloading too many web components.

A browser control 402 is a module that loads the web loader 404. For example, the browser control 402 may be a local program library that provides utilities for loading the web loader 404.

A web loader 404 is a program that exchanges communications with the web server 320 to obtain webpage data, and the web loader 404 provides an interface with the native app 302 for fulfilling requests and providing information. In some example embodiments, the web loader 404 is a separate program from the native app 302, and in other embodiments, the web loader 404 is a module inside the native app 302.

Further, although a single web loader 404 is illustrated, there could be multiple web loaders 404, and each web loader 404 may have a specific function, such as preloading the components for a specific feature in the UI.

Furthermore, although a separate browser control 402 and web loader 404 are illustrated, some embodiments may combine the two into a single module.

At operation 406, the native app 302 creates a dialog feature (e.g., to load a webpage) and keeps the information associated with the dialog hidden from view in the UI.

At operation 408, the native app 302 activates the web loader 404 to preload one or more web components and cached the information in memory. Additionally, if the user has not been authenticated yet, the users is authenticated with the server and the authentication token is also stored in memory.

At operation 410, instructions are sent to the web loader 404 via the browser control 402 to navigate to the corresponding web page, in the web server 320, with the given configuration parameters (e.g., user identifier, group name). The web loader 404 establishes the dialog with the web server 320 and authenticates the user. It is noted that operation 408 may be slow because of the need to download the URL data and the need to authenticate the user.

At operation 412, the native app 302 requests to preload data for a webpage, which is referred to herein as a dialog webpage with the user, but any type of webpage may apply. The native app 302 sends the webpage name to the browser control 402, which forwards the webpage name to the web loader 404.

The web loader then determines the web components already preloaded and the web components that need to be downloaded. If there are web components that need to be downloaded, the web loader downloads them from the web server 320.

After all the web components are downloaded, the web loader sends a webpage load complete message to the browser control 402, which is forwarded to the native app 302. Further, the web loader 404 is suspended (e.g., closes) and the native app 302 is notified via the browser control 402. The preload operations are transparent to the user, that is, the user is not aware that web components are being loaded in the background, that is, the preloaded information is not visible in the UI presented to the user until the corresponding dialog feature is activated by the user.

The native app 302 maintains the dialog hidden 414 from view until requested. At operation 416, the native app 302 detects that the user has requested the dialog, e.g., changed the user interface to the UI for the dialog.

The native app 302 sends a load webpage message to the web loader 404 via the browser control 402. The web loader 404 then determines the web components already preloaded and the web components that need to be downloaded based on the state of the UI (e.g., user ID, option selected). The web loader 404 then loads from the web server 320 the web components that are not cached in the memory. The web loader 404 combines the cached data (if any) and the downloaded data (if any) and sends the combined data to the native app 302 via the browser control 402.

When the user selects the dialog at operation 416, the loading of the webpage is faster than it would be on a regular browser because the web loader 404 has already preloaded some or all of the required web components.

It is noted, that after the user leaves the dialog UI, the corresponding web components are still maintained in memory, so if the user comes back, the loading of the UI will still be fast.

It is noted that the embodiments illustrated in FIG. 4 are examples and do not describe every possible embodiment. Other embodiments may combine into one module the browser control 402 with the web loader 404, utilize different messages, preload different information, etc. The embodiments illustrated in FIG. 4 should therefore not be interpreted to be exclusive or limiting, but rather illustrative.

The preload strategy provides three benefits. First, reduction of time for loading a webpage (e.g., a performance improvement with an 80% reduction of the UI loading time). Second, reduce memory consumption by using a single browser control that does not increase as more web loaders are added. Third, improve the user experience on the native app to provide similar performance to the one on the browser interface.

Figure 5:
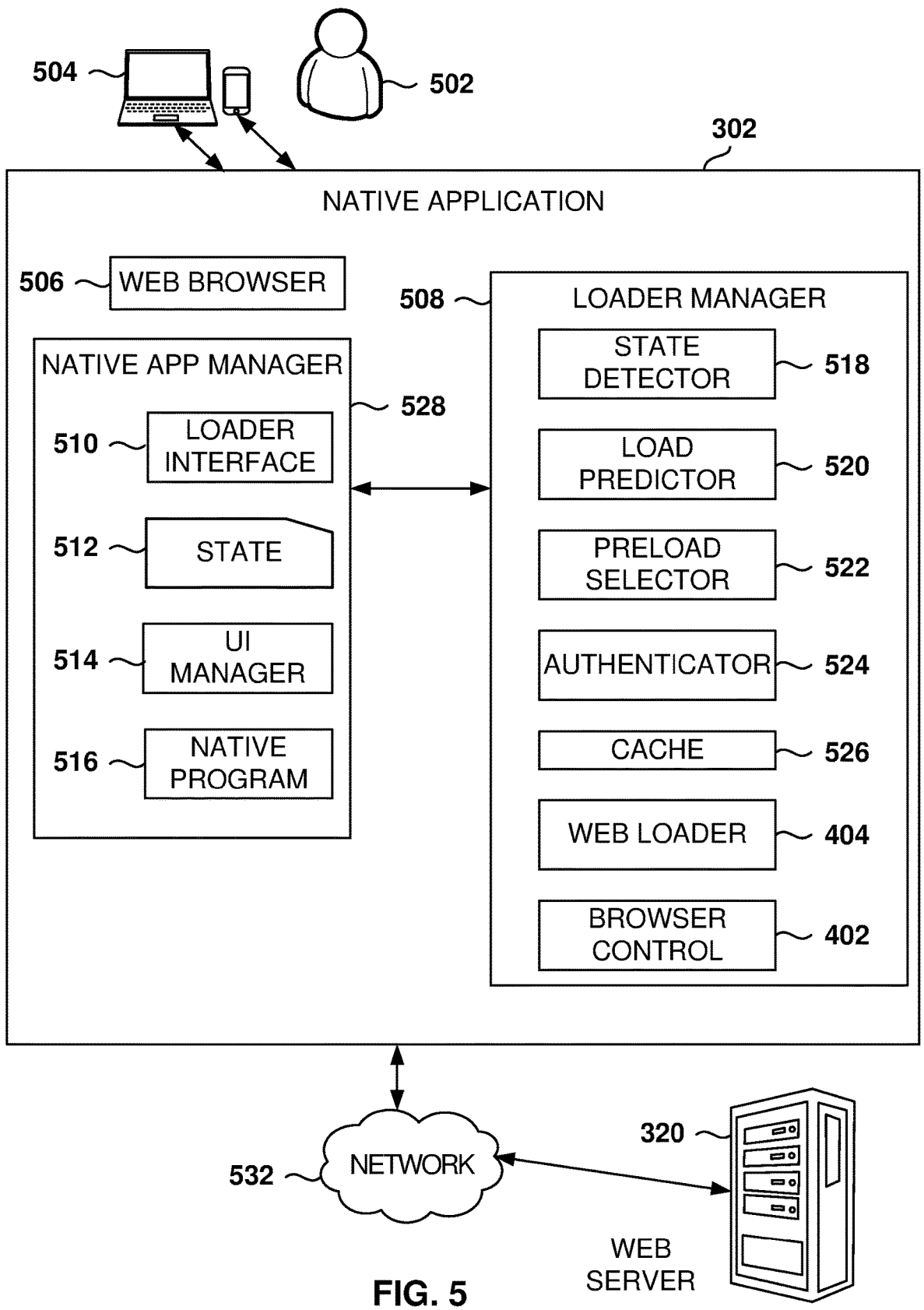
FIG. 5 is a system that includes a loader manager for loading web components, according to some example embodiments.

FIG. 5 is a system that includes a loader manager 508 for loading web components, according to some example embodiments. A web server 320 provides server-side functionality via a network 532 (e.g., the Internet or a wide area network (WAN)) to one or more client devices 504.

The client device 504 may comprise, but is not limited to, a mobile phone, a desktop computer, a laptop, a portable digital assistant (PDA), a smart phone, a tablet, a netbook, a multi-processor system, a microprocessor-based or programmable consumer electronic system, or any other communication device that a user 502 may utilize to access the web server 320. In some embodiments, the client device 504 may comprise a display module to display information (e.g., in the form of user interfaces).

The client device 504 may include one or more applications (also referred to as "apps"), a web browser, and other client applications, such as a messaging application, an electronic mail (email) application, a news application, and the like.

In some example embodiments, the client device 504 includes the native application 302. The native application 302 includes a web browser engine 506, a native app manager 528, and a loader manager 508. The web browser engine 506 provides web browser functionality and may include a limited set of browser-features for presenting UIs associated with web services.

The native app manager 528 includes the components associated with the native app, such as the native program 516 that provides the custom functionality of the native app 302 (e.g., email application, teams application, word processor). Further, the native app manager 528 includes a loader interface 510, a state 512, and a UI manager 514.

The loader interface 510 interfaces with the loader manager 508. In some embodiments, the loader interface 510 sends requests to the loader manager 508 to perform webpage operations. The loader manager 508 may also monitor the state 512 (e.g., current UI being presented to the user) of the native app and decide which webpages to preload. The state 512 provides information about the current state of the native app 302, and may include one or more of user information, UI being presented, user history, memory use, memory available, client device information, etc.

The UI manager 514 provides UI functionality for presenting the UI to the user 502 in the client device 504. Further, the native program 516 is a program that executes the client device 504 to provide native app functionality.

It is noted that the UI manager 514 may render a webpage exactly as the page would look on a browser (e.g., by utilizing web browser engine 506), and the UI manager 514 may also provide a custom UI using the information obtain from the webpage. That is, the UI manager may present a UI that is different from the browser UI. This may be useful in some cases, such as when the client device 504 is a mobile phone and the UI can be customized to fit in the small display of the mobile phone.

The loader manager 508 provides capabilities for implementing browser-based capabilities within the native app 302. In some example embodiments, the loader manager 508 includes a state detector 518, a load predictor 520, a preloaded selector 522, an authenticator 524, a cache 526, a web loader 404, and a browser control 402.

The state detector 518 access the state 512 information to determine the current state of the native app 302. The load predictor 520 analyzes the state 512 and predicts webpages that the user may select based on the state. For example, the load predictor 520 may determine that the user is accessing the UI of FIG. 1 and determine that the user may load other UIs related to group functionality.

The preload selector 522 determines which web components to preload for a given webpage. The preload selector 522 may obtain the webpages that may be preloaded from the load predictor 520 and selects the web components to load based on the resources available, benefit of preloading, amount of bandwidth needed to download, etc. For example, the preload selector 522 may decide to preload all the static components for a given webpage. Additionally, the preload selector may determine to preload one or more of the dynamic components.

The authenticator 524 authenticates the user with the webserver that provides the services for one or more webpages. Once the user is authenticated, the authentication token is used for future downloads from the server. The authenticator 524 may periodically re-authenticate the user if the authentication token expires.

The cache 526 stores information used by the loader manager 508, such as the preloaded web components for certain webpages. The information may also include the time when the web component was uploaded, and a process may be used to clear from cache stale entries after a predetermined amount of time has elapsed since the component was preloaded.

The web loader 404 exchanges communication with the web server 320 to download the web components, either ahead of time or when the web components are required for the UI.

In some example embodiments, the preload selector 522 utilizes heuristics to determine which components to preload. Some of the heuristic factors utilized by the preload selector 522 to determine components to preload include:

Options available on the UI being presented to the user (e.g., group options, chat options)
Amount of space available in memory to store the web components;
Hardware capabilities of the device (e.g., CPU model, disk storage available, network bandwidth);
Current CPU utilization of the device;
Cost of downloading a web component in terms of time and computer-resource utilization;
Benefit of preloading a web component, e.g., amount of time saved compared to having to load while user is waiting for the response;
User history when using the native app 302 (e.g., to determine operations most commonly used by the user;
History of a plurality of users when using the native app 302 (e.g., determine most frequent options utilized by users);

Based on one or more of these factors, the preload selector 522 determines which components to preload in the background and requests the web loader 404 to preload these components.

It is noted that the embodiments illustrated in FIG. 5 are examples and do not describe every possible embodiment. Other embodiments may utilize different modules, combine two or more modules into one, divide one module into several modules, include additional or fewer modules, etc. The embodiments illustrated in FIG. 5 should therefore not be interpreted to be exclusive or limiting, but rather illustrative.

Figure 6:
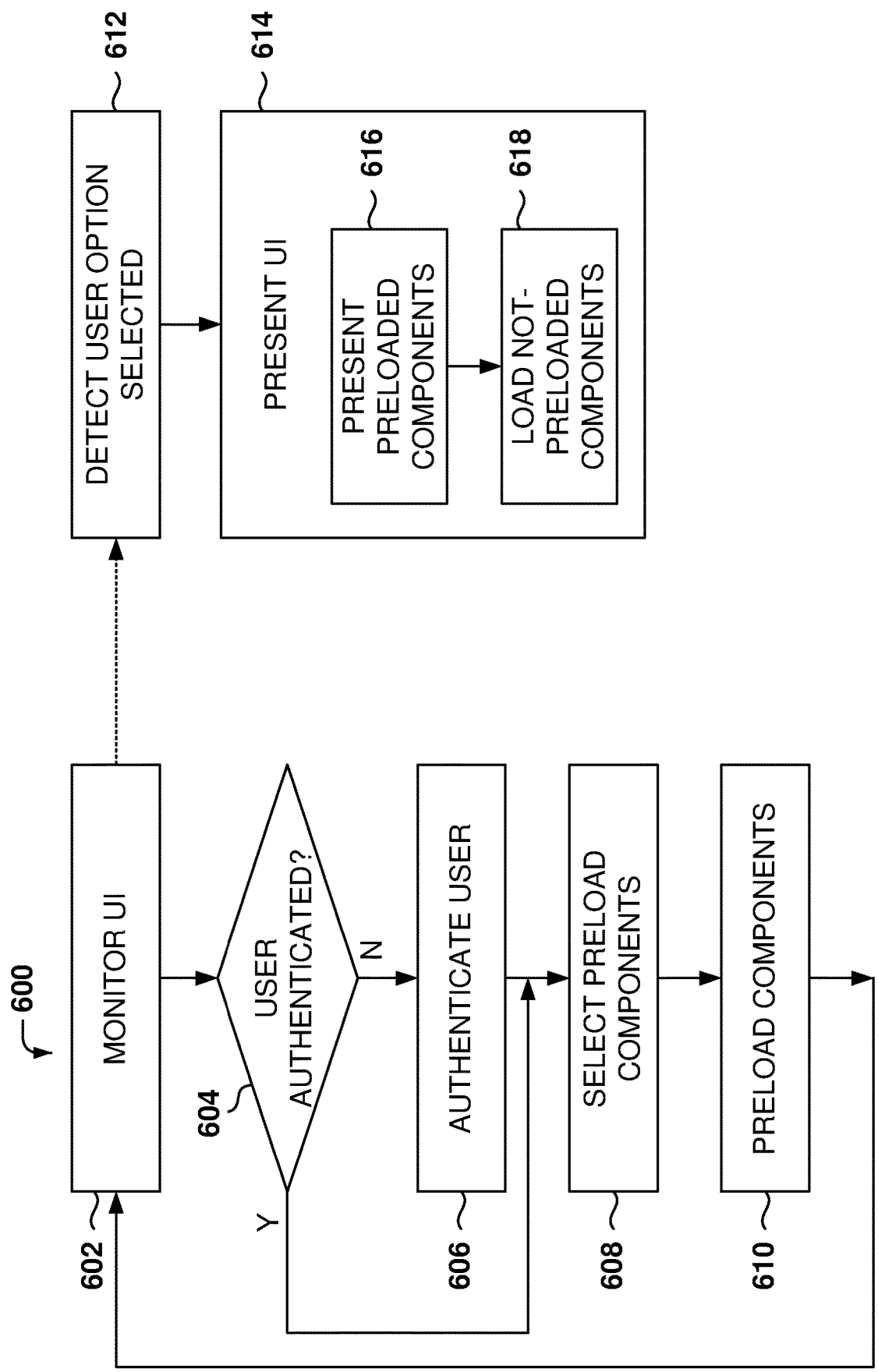
FIG. 6 is a flowchart of a method for managing the loading of components, according to some example embodiments.

FIG. 6 is a flowchart of a method 600 for managing the loading of components, according to some example embodiments. While the various operations in this flowchart are presented and described sequentially, one of ordinary skill will appreciate that some or all of the operations may be executed in a different order, be combined or omitted, or be executed in parallel.

At operation 602, the UI state is monitored. At operation 604, a check is made to determine if the user has been authenticated for accessing a webpage that is associated with the UI (e.g., a server providing chat functionality). If the user has been authenticated, the method 600 flows to operation 608, and if the user has not been authenticated, the method 600 flows to operation 606 to authenticate the user with the web server.

At operation 608, the components to be preloaded are selected, and, at operation 610, the selected components are preloaded.

At operation 612, the method 600 detects that the user has selected the option to load the UI. That UI is presented at operation 614, which includes operations 616 and 618.

At operation 616, the preloaded components are presented in the UI. Since some of the components are preloaded, the UI presentation is faster when compared to having to download all the web components for a webpage as in a standard browser. Further, since the user has already been authenticated, the authentication operation is skipped, resulting in significant improvement to the response time.

At operation 618, the components that have not been preloaded are downloaded from the server and presented in the UI.

In one example, the selected web components comprise static components and dynamic components, the static components not depending on user parameters, the dynamic components being a function of one or more user parameters.

In one example, preloading the selected web components comprises preloading the static components.

In one example, preloading the selected web components comprises preloading dynamic components for a plurality of values for one of the user parameters.

In one example, the preloaded web components are not presented until detecting that the second UI has been selected.

In one example, the method 600 further comprises detecting a selection to exit the second UI and keeping in memory the web components of the second UI after exiting the second UI.

In one example, the native app comprises a browser engine, a native app manager, and a loader manager for preloading web components.

In one example, the native app manager sends an instruction to the loader manager to preload web components.

In one example, selecting web components further comprises identifying other UIs selectable while accessing the first UI, selecting which of the other UIs to preload based on one or more rules, and preloading the web components for the selected UIs.

In one example, the rules comprise one or more of selectable options available in the first UI, amount of space available in memory to store the web components, hardware capabilities of a device presenting the first UI, current CPU utilization of the device, cost of downloading the web component, benefit of preloading the web component, user history when using the native app, and history of a plurality of users when using the native app.

Another general aspect is for a system that includes a memory comprising instructions and one or more computer processors. The instructions, when executed by the one or more computer processors, cause the one or more computer processors to perform operations comprising: monitoring a first user interface (UI) presented on a native app; based on the monitoring, determining a second UI that may be selected when the first UI is being presented, the second UI based on web components downloaded from a web server; authenticating a user for accessing the web server; selecting web components associated with the second UI for preloading; preloading the selected web components; detecting that the second UI has been selected; and causing presentation of the second UI by: presenting the preloaded components on the second UI; and downloading and presenting in the second UI the web components not preloaded.

In yet another general aspect, a machine-readable storage medium (e.g., a non-transitory storage medium) includes instructions that, when executed by a machine, cause the machine to perform operations comprising: monitoring a first user interface (UI) presented on a native app; based on the monitoring, determining a second UI that may be selected when the first UI is being presented, the second UI based on web components downloaded from a web server; authenticating a user for accessing the web server; selecting web components associated with the second UI for preloading; preloading the selected web components; detecting that the second UI has been selected; and causing presentation of the second UI by: presenting the preloaded components on the second UI; and downloading and presenting in the second UI the web components not preloaded.

In view of the disclosure above, various examples are set forth below. It should be noted that one or more features of an example, taken in isolation or combination, should be considered within the disclosure of this application.

Figure 7:
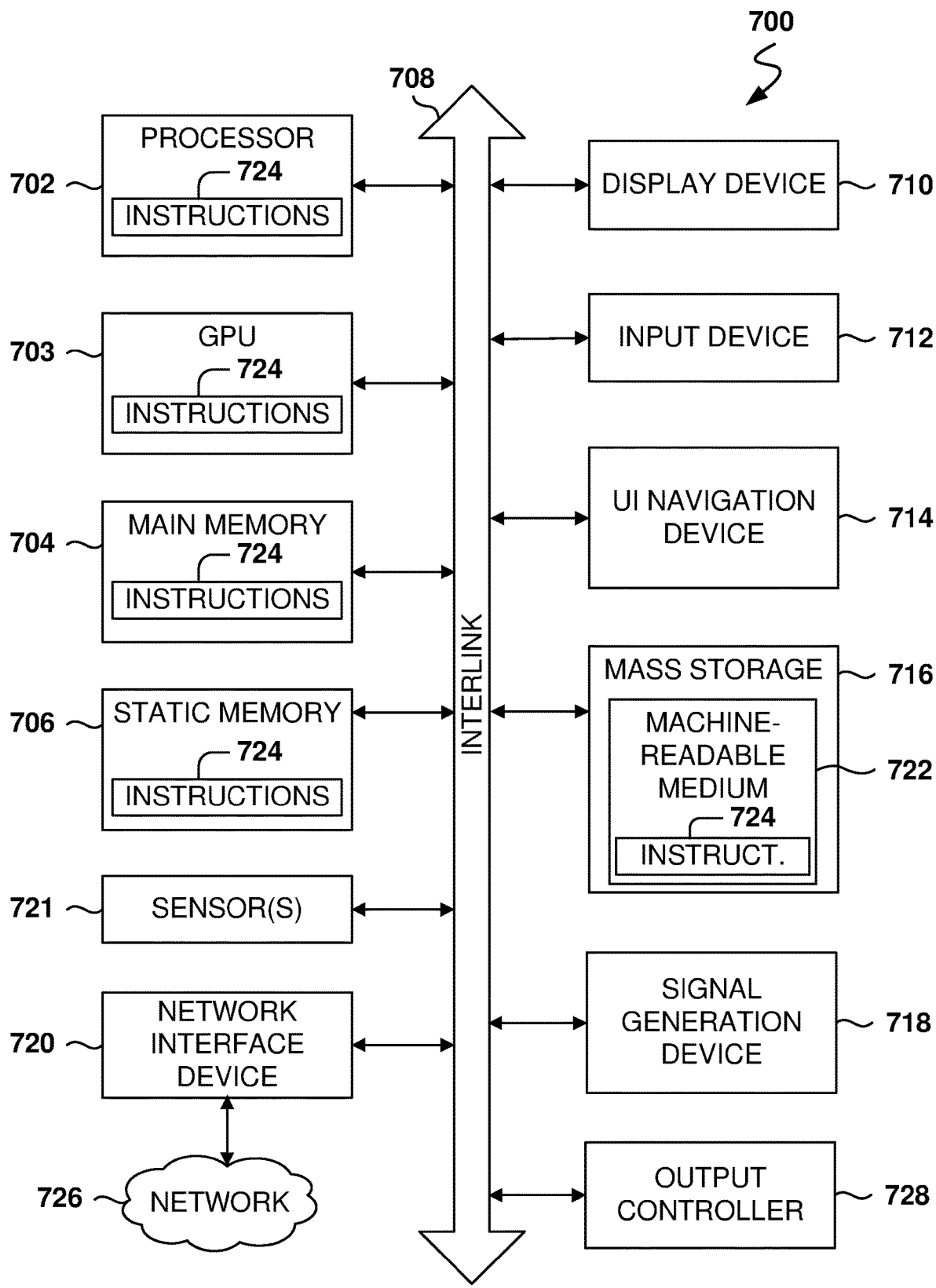
FIG. 7 is a block diagram illustrating an example of a machine upon or by which one or more example process embodiments described herein may be implemented or controlled.

FIG. 7 is a block diagram illustrating an example of a machine 700 upon or by which one or more example process embodiments described herein may be implemented or controlled. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in a peer-to-peer (P2P) (or other distributed) network environment. Further, while only a single machine 700 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 700 may include a hardware processor 702 (e.g., a central processing unit (CPU), a hardware processor core, or any combination thereof), a graphics processing unit (GPU) 703, a main memory 704, and a static memory 706, some or all of which may communicate with each other via an interlink (e.g., bus) 708. The machine 700 may further include a display device 710, an alphanumeric input device 712 (e.g., a keyboard), and a user interface (UI) navigation device 714 (e.g., a mouse). In an example, the display device 710, alphanumeric input device 712, and UI navigation device 714 may be a touch screen display. The machine 700 may additionally include a mass storage device (e.g., drive unit) 716, a signal generation device 718 (e.g., a speaker), a network interface device 720, and one or more sensors 721, such as a Global Positioning System (GPS) sensor, compass, accelerometer, or another sensor. The machine 700 may include an output controller 728, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 716 may include a machine-readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, within the hardware processor 702, or within the GPU 703 during execution thereof by the machine 700. In an example, one or any combination of the hardware processor 702, the GPU 703, the main memory 704, the static memory 706, or the mass storage device 716 may constitute machine-readable media.

While the machine-readable medium 722 is illustrated as a single medium, the term "machine-readable medium" may include a single medium, or multiple media, (e.g., a centralized or distributed database, and/or associated caches and servers) configured to store the one or more instructions 724.

The term "machine-readable medium" may include any medium that is capable of storing, encoding, or carrying instructions 724 for execution by the machine 700 and that cause the machine 700 to perform any one or more of the techniques of the present disclosure, or that is capable of storing, encoding, or carrying data structures used by or associated with such instructions 724. Non-limiting machine-readable medium examples may include solid-state memories, and optical and magnetic media. In an example, a massed machine-readable medium comprises a machine-readable medium 722 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is provisionally claimed is:

1. A computer-implemented method comprising:
monitoring a first user interface (UI) presented on a native app;
based on the monitoring, determining a second UI that may be selected when the first UI is being presented, the second UI based on web components downloaded from a web server;
authenticating a user for accessing the web server;
selecting web components associated with the second UI for preloading;
preloading the selected web components;
detecting that the second UI has been selected; and
causing presentation of the second UI by:
presenting the preloaded components on the second UI; and
downloading and presenting in the second UI the web components not preloaded.

2. The method as recited in claim 1, wherein the selected web components comprise static components and dynamic components, the static components not depending on user parameters, the dynamic components being a function of one or more user parameters.

3. The method as recited in claim 2, wherein preloading the selected web components comprises preloading the static components.

4. The method as recited in claim 2, wherein preloading the selected web components comprises preloading dynamic components for a plurality of values for one of the user parameters.

5. The method as recited in claim 1, wherein the preloaded web components are not presented until detecting that the second UI has been selected.

6. The method as recited in claim 1, further comprising:
detecting a selection to exit the second UI; and
keeping in memory the web components of the second UI after exiting the second UI.

7. The method as recited in claim 1, wherein the native app comprises:
a browser engine;
a native app manager; and a
loader manager for preloading web components.

8. The method as recited in claim 7, wherein the native app manager sends an instruction to the loader manager to preload web components.

9. The method as recited in claim 1, wherein selecting web components further comprises:
identifying other UIs selectable while accessing the first UI;
selecting which of the other UIs to preload based on one or more rules; and
preloading the web components for the selected UIs.

10. The method as recited in claim 9, wherein the rules comprise one or more of:
selectable options available in the first UI;
amount of space available in memory to store the web components;
hardware capabilities of a device presenting the first UI;
current CPU utilization of the device;
cost of downloading the web component;
benefit of preloading the web component;

user history when using the native app; and
history of a plurality of users when using the native app.

11. A system comprising:
a memory comprising instructions; and
one or more computer processors, wherein the instructions, when executed by the one or more computer processors, cause the system to perform operations comprising:
monitoring a first user interface (UI) presented on a native app;
based on the monitoring, determining a second UI that may be selected when the first UI is being presented, the second UI based on web components downloaded from a web server;
authenticating a user for accessing the web server;
selecting web components associated with the second UI for preloading;
preloading the selected web components;
detecting that the second UI has been selected; and
causing presentation of the second UI by:
presenting the preloaded components on the second UI; and
downloading and presenting in the second UI the web components not preloaded.

12. The system as recited in claim 11, wherein the selected web components comprise static components and dynamic components, the static components not depending on user parameters, the dynamic components being a function of one or more user parameters.

13. The system as recited in claim 12, wherein preloading the selected web components comprises preloading the static components.

14. The system as recited in claim 12, wherein preloading the selected web components comprises preloading dynamic components for a plurality of values for one of the user parameters.

15. The system as recited in claim 11, wherein the preloaded web components are not presented until detecting that the second UI has been selected.

16. A tangible machine-readable storage medium including instructions that, when executed by a machine, cause the machine to perform operations comprising:
monitoring a first user interface (UI) presented on a native app;
based on the monitoring, determining a second UI that may be selected when the first UI is being presented, the second UI based on web components downloaded from a web server;
authenticating a user for accessing the web server;
selecting web components associated with the second UI for preloading;
preloading the selected web components;
detecting that the second UI has been selected; and
causing presentation of the second UI by:
presenting the preloaded components on the second UI; and
downloading and presenting in the second UI the web components not preloaded.

17. The tangible machine-readable storage medium as recited in claim 16, wherein the selected web components comprise static components and dynamic components, the static components not depending on user parameters, the dynamic components being a function of one or more user parameters.

18. The tangible machine-readable storage medium as recited in claim 17, wherein preloading the selected web components comprises preloading the static components.

19. The tangible machine-readable storage medium as recited in claim 17, wherein preloading the selected web components comprises preloading dynamic components for a plurality of values for one of the user parameters.

20. The tangible machine-readable storage medium as recited in claim 16, wherein the preloaded web components are not presented until detecting that the second UI has been selected.

* * * * *